United States Patent
Wang et al.

(10) Patent No.: US 8,644,288 B2
(45) Date of Patent: Feb. 4, 2014

(54) UPLINK SPATIAL DIVISION MULTIPLE ACCESS (SDMA) USER PAIRING AND SCHEDULING

(75) Inventors: Fan Wang, Chicago, IL (US); Stanley J. Benes, Round Lake Beach, IL (US); Amitabha Ghosh, Buffalo Grove, IL (US); Chandrasekar Sankaran, Arlington Heights, IL (US); Timothy J. Wilson, Rolling Meadows, IL (US); Fei Tong, Swindon (GB); Nick W. Whinnett, Marlborough (GB)

(73) Assignee: Motorola Mobility LLC, Libertyville, IL (US)

( * ) Notice: Subject to any disclaimer, the term of this patent is extended or adjusted under 35 U.S.C. 154(b) by 995 days.

(21) Appl. No.: 12/183,216

(22) Filed: Jul. 31, 2008

(65) Prior Publication Data
US 2010/0029288 A1  Feb. 4, 2010

(51) Int. Cl.
*H04J 11/00* (2006.01)
*H04W 4/00* (2009.01)
*H04B 7/208* (2006.01)

(52) U.S. Cl.
USPC ........... 370/344; 370/208; 370/328; 370/331; 370/338; 370/341

(58) Field of Classification Search
USPC ....................................................... 370/344
See application file for complete search history.

(56) References Cited

U.S. PATENT DOCUMENTS

| | | | |
|---|---|---|---|
| 8,040,969 B2 | 10/2011 | Mazet et al. | |
| 2005/0002467 A1* | 1/2005 | Seo et al. | 375/267 |
| 2005/0030891 A1* | 2/2005 | Stephens et al. | 370/229 |
| 2005/0265470 A1* | 12/2005 | Kishigami et al. | 375/267 |
| 2006/0067269 A1* | 3/2006 | Jugl et al. | 370/329 |
| 2006/0159004 A1* | 7/2006 | Ji | 370/208 |
| 2006/0164972 A1* | 7/2006 | van Rensburg et al. | 370/208 |
| 2006/0255989 A1* | 11/2006 | Kim et al. | 341/120 |
| 2006/0281494 A1* | 12/2006 | Wilson et al. | 455/562.1 |

(Continued)

FOREIGN PATENT DOCUMENTS

| EP | 1784032 A1 | 5/2007 |
|---|---|---|
| WO | 2007109630 A1 | 9/2007 |

OTHER PUBLICATIONS

Letaief, K B et al.: "An Efficient Resource-Allocation Scheme for Spatial Multiuser Access in MIMO-OFDM Systems", IEEE Transactions on Communications, IEEE Service Center, Piscataway, NJ, US vol. 53, No. 1, Jan. 1, 2005, pp. 107-116.

(Continued)

*Primary Examiner* — Ian N Moore
*Assistant Examiner* — Jenee Alexander

(57) ABSTRACT

A method, system and communication network for transmitting information signals via uplink (UL) collaborative SDMA, in a wireless communication system. Base station receiver estimates a channel gain associated with the transmission path(s) of each user and keeps a matrix of normalized covariance, between users. Based on the estimated channel gain and the normalized covariance, ULS utility is able to compute channel capacity. Based on capacity estimates of (1) the multiplexed user signals and (2) the individual user signals, signals are either multiplexed for UL SDMA or are transmitted individually. An optimal selection of multiplexed signals may be based upon: (1) a cross user interface measurement; and (2) a selection mechanism based on eigen-decomposition techniques. The ULS utility enables a UL scheduler to pair information signals with clear spatial distinction and minimal correlation, based on capacity evaluations.

23 Claims, 10 Drawing Sheets

(56) References Cited

U.S. PATENT DOCUMENTS

| | | | |
|---|---|---|---|
| 2007/0149236 A1* | 6/2007 | Naden et al. | 455/522 |
| 2007/0171808 A1 | 7/2007 | Wu et al. | |
| 2007/0223423 A1* | 9/2007 | Kim et al. | 370/334 |
| 2007/0297386 A1* | 12/2007 | Zhang et al. | 370/344 |
| 2008/0031125 A1* | 2/2008 | Vandewiele | 370/203 |
| 2008/0123616 A1* | 5/2008 | Lee | 370/344 |
| 2008/0291978 A1* | 11/2008 | Jonsson et al. | 375/144 |
| 2009/0023467 A1* | 1/2009 | Huang et al. | 455/522 |
| 2009/0046569 A1* | 2/2009 | Chen et al. | 370/203 |
| 2009/0257384 A1* | 10/2009 | Lee et al. | 370/329 |

OTHER PUBLICATIONS

Thomas, T A et al.: "User Selection for SDMA Beamforming with Imperfect CSI in MIMO-OFDM Systems", Communications, 2007, ICC '07, IEEE International Conference on, IEEE, PI, Jun. 1, 2007, pp. 5419-5422.

Maciel T F et al.: "A performance-complexity analysis of four suboptimal SDMA algorithms", Smart Antennas, 2008, WSA 2008, International ITG Workshop on IEEE, Piscataway, NJ, USA Feb. 26, 2008, pp. 225-232.

Martinez Martinez, V: The International Search Report and The Written Opinion of the International Searching, Authority, or the Declaration, European Patent Office,, Rijswijk, completion: Nov. 24, 2009, mailing: Dec. 2, 2009.

3GPP TSG RAN WG1 #44, R1-060335 "Downlink MIMO for EUTRA" Samsung, Denver, USA, Feb. 13-17, 2006, 10 pages.

3GPP TSG RAN WG1 #46bis, R1-062525 "Dynamic Mode Switching between Single and Multi-User MIMO" Samsung, Seoul, Korea, Oct. 9-13, 2006, 4 pages.

3GPP TSG RAN WG1 #48bis, R1-071510 "Details of Zero-forcing MU-MIMO for DL EUTRA" Freescale Semiconductor Inc., St. Julian's, Malta, Mar. 2007, 6 pages.

H. Yin and H. Liu, "Performance of Space-Division Multiple-Access (SDMA) With Scheduling", IEEE Transactions on Wireless Communications vol. 1, No. 4, Oct. 2002, pp. 611-618.

* cited by examiner

Figure 3A $$\begin{bmatrix} y_1 \\ y_2 \\ \vdots \\ y_{Mr} \end{bmatrix} = \begin{bmatrix} h_{1,1} & h_{1,2} \\ h_{2,1} & h_{2,2} \\ \vdots & \vdots \\ h_{Mr,1} & h_{Mr,2} \end{bmatrix} \begin{bmatrix} s_1 \\ s_2 \end{bmatrix} + \begin{bmatrix} n_1 \\ n_2 \\ \vdots \\ n_{Mr} \end{bmatrix}$$

301

$$H = \begin{bmatrix} h_{1,1} & h_{2,1} & \cdots & h_{Mr,1} \\ h_{1,2} & h_{2,2} & \cdots & h_{Mr,2} \end{bmatrix}^T$$

302

$$E\left[\left|n_i\right|^2\right] = \sigma_0^2$$

303

$$B = \sum_{i=0}^{Mr-1} h_{i0}^* \cdot h_{i1}$$

305

$$E = \sum_{i=0}^{Mr-1} h_{i0}^* \cdot h_{i0}$$

306

$$F = \sum_{i=0}^{Mr-1} h_{i1}^* \cdot h_{i1}$$

307

$$D = \eta \cdot F + \sigma_0^2$$

308

$$SINR_0^{MIMO} = \frac{\left|\eta \cdot F \cdot E - \eta \cdot B \cdot B^* + \sigma_0^2 \cdot E\right|^2}{\eta \cdot \left|\sigma_0^2 \cdot B\right|^2 + \sigma_0^2 \cdot \left[\left((D \cdot E - \eta \cdot B \cdot B^*\right) \cdot D - \eta \cdot (D \cdot B - B \cdot \eta \cdot F) \cdot B^*\right]}$$

304

Figure 3B $$SINR_0^{MIMO} = \widetilde{SINR_0^{MIMO}} \cdot \left\{ 1 - \frac{\eta \cdot L}{\eta + \frac{1}{\widetilde{SINR_1^{MIMO}}}} \right\}$$

311

$$L = \frac{B^* \cdot B}{E \cdot F} = \frac{\left| \sum_{i=0}^{M_r-1} h_{i0}^* \cdot h_{i1} \right|^2}{\left( \sum_{i=0}^{M_r-1} h_{i0}^* \cdot h_{i0} \right) \cdot \left( \sum_{i=0}^{M_r-1} h_{i1}^* \cdot h_{i1} \right)}$$

312

$$\widetilde{SINR_0^{MIMO}} = \frac{E}{\sigma_0^2} \qquad \widetilde{SINR_1^{MIMO}} = \frac{F}{\sigma_0^2}$$

313　　　　　　　314

Figure 3C $$316 \quad SINR_0^{MIMO} = \widetilde{SINR}_0^{MIMO} = \frac{E}{\sigma_0^2}$$

$$317 \quad SINR_1^{MIMO} = \frac{\left|E \cdot F - B \cdot B^* + \sigma_0^2 \cdot F\right|^2}{\left|\sigma_0^2 \cdot B\right|^2 + \sigma_0^2 \cdot \left[\left((B^* \cdot E - A \cdot B^*) \cdot B + (A \cdot F - B^* \cdot B) \cdot A\right]\right.}$$

$$318 \quad A = E + \sigma_0^2$$

$$319 \quad SINR_1^{MIMO} = \widetilde{SINR}_1^{MIMO} \cdot \left\{ 1 - \cfrac{L}{1 + \cfrac{1}{\widetilde{SINR}_0^{MIMO}}} \right\}$$

Figure 3D

321 $\quad \alpha \cdot \log\left(1+\beta \cdot SINR_0^{MIMO}\right) + \alpha \cdot \log\left(1+\beta \cdot SINR_1^{MIMO}\right) \geq \alpha \cdot \log\left(1+\beta \cdot \sqrt{SINR_0^{MIMO}} \cdot \sqrt{SINR_1^{MIMO}}\right)$ 322 $\quad SINR_0^{MIMO} + SINR_1^{MIMO} + \beta \cdot SINR_0^{MIMO} \cdot SINR_1^{MIMO} \geq \sqrt{SINR_0^{MIMO}} \cdot \sqrt{SINR_1^{MIMO}}$ 323 $\quad \min\left(SINR_0^{MIMO}, SINR_1^{MIMO}\right) \geq \Psi$

Figure 3E

326 $H(i,j) = \begin{bmatrix} h_{1,i} & h_{2,i} & \cdots & h_{M_r,i} \\ h_{1,j} & h_{2,j} & \cdots & h_{M_r,j} \end{bmatrix}^T$ 327 $(m,n) = \arg\max_{i,j\in[1,N], i\neq j} \log_2 \det(I + \frac{E_s}{N_0} H(i,j) H^H(i,j))$ 328 $H(i) = \begin{bmatrix} h_{1,i} & \cdots & h_{M_r,i} \end{bmatrix}^T$ 329 $m = \arg\max_{i\in[1,N]} \log_2 \det(1 + \frac{E_s}{N_0} H^H(i) H(i))$ 330 $n = \arg\max_{j\in[1,N], j\neq m} \log_2 \det(I + \frac{E_s}{N_0} H(m,j) H^H(m,j))$ 331 $H_k(i,j) = \begin{bmatrix} h_{1,i} & h_{2,i} & \cdots & h_{M_r,i} \\ h_{1,j} & h_{2,j} & \cdots & h_{M_r,j} \end{bmatrix}^T$ 332 $(m,n) = \arg\max_{i,j\in[1,N], i\neq j} \sum_k \log_2 \det(I + \frac{E_s}{N_0} H_k(i,j) H_k^H(i,j))$

Figure 3F

336 $R(i) = \frac{1}{K}\sum_{k=1}^{K} H_k^H(i)H_k(i)$     337 $R(i) = V(i)^H \Lambda V(i), V \in C^{Mr \times Mr}$ 338 $\tilde{H}(i) = \sqrt{\lambda_{\max}(i)} V_{\max}(i)$     339 $\tilde{H}(i,j) = [\tilde{H}(i) \ \tilde{H}(j)]$ 340 $(m,n) = \arg\max_{i,j \in [1...N], i \neq j} \log_2 \det(I + \frac{E_s}{N_0}\tilde{H}(i,j)\tilde{H}^H(i,j))$ 341 $\gamma(i,m) = \dfrac{\lambda_m(i)}{\dfrac{1}{Mr}\sum_{n=1}^{Mr}\lambda_n(j)V_m^H(i)V_n(j) + \sigma^2}$ 342 $\Gamma(i,j) = \sum_{m=1}^{Mr}\gamma(i,m) + \sum_{m=1}^{Mr}\gamma(j,m)$     343 $(m,n) = \arg\max_{i,j \in [1...N], i \neq j} \Gamma(i,j)$

US 8,644,288 B2

UPLINK SPATIAL DIVISION MULTIPLE ACCESS (SDMA) USER PAIRING AND SCHEDULING

BACKGROUND

1. Technical Field

The present invention generally relates to wireless communication systems and in particular to scheduling and allocating resources for transmitting information signals in wireless communication systems.

2. Description of the Related Art

Uplink (UL) Collaborative Spatial Division Multiple Access (SDMA) is one of the advanced features in broadband wireless communication systems, such as the mobile Worldwide Interoperability for Microwave Access (WiMAX), where two different single-antenna subscribers share the same time-frequency resources using Orthogonal Frequency Division Multiple Access (OFDMA), transmitting independent data streams. Conventionally, any two users were randomly paired on a frame basis for the UL SDMA. Unfortunately, blind/random scheduling method results in system performance degradation, which means less system throughput or capacity.

SUMMARY OF ILLUSTRATIVE EMBODIMENTS

Disclosed are a method, system and communication network for transmitting information signals via uplink (UL) collaborative SDMA in a wireless communication system. An uplink scheduling (ULS) utility employs uplink signals, such as a channel quality indicator (CQI) feedback signal and/or an uplink sounding signal, to estimate a channel gain associated with a transmission path(s) of each user. Based on the estimated channel gain, the ULS utility is able to compute channel capacity. Based on capacity estimates of (1) the multiplexed user signals and (2) the individual user signals, signals are either multiplexed for UL SDMA or are transmitted individually. An optimal selection of multiplexed signals may be based upon: (1) a cross user interference estimate; and (2) a selection mechanism based on eigen-decomposition techniques. The ULS utility enables a UL scheduler to pair information signals with clear spatial distinction and minimal correlation, based on capacity evaluations.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 3A-3F illustrate a number of equations employed in the UL SDMA pairing methods according to one embodiment of the invention;

DETAILED DESCRIPTION OF AN ILLUSTRATIVE EMBODIMENT

Figure 1:
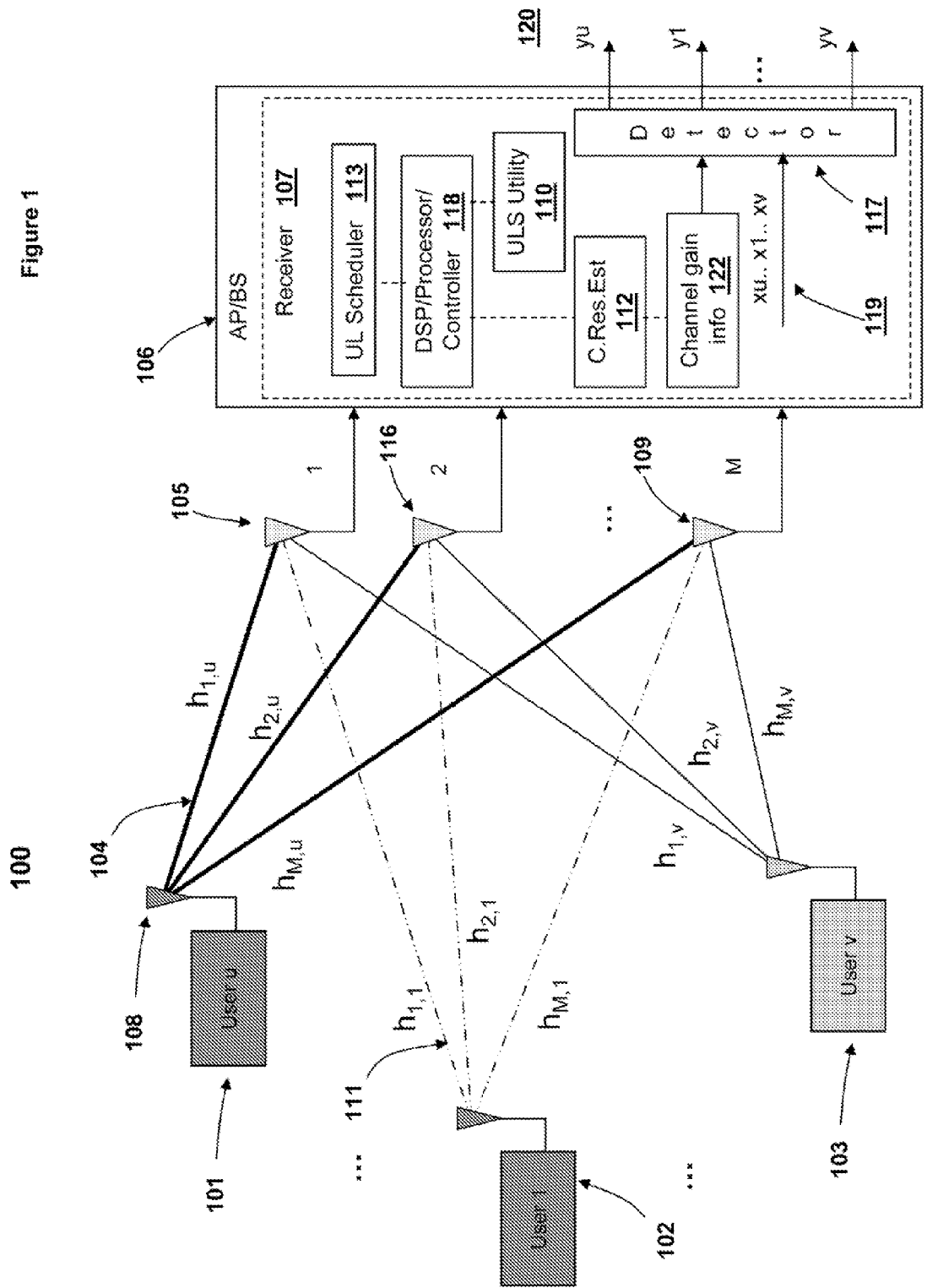
FIG. 1 is a block diagram representation of a wireless communication system which employs uplink collaborative spatial division multiple access (SDMA) according to one embodiment of the invention.

The illustrative embodiments provide a method, system and communication network for transmitting information signals via uplink (UL) collaborative SDMA in a wireless communication system. An uplink scheduling (ULS) utility employs uplink signals, such as a channel quality indicator (CQI) feedback signal and/or an uplink sounding signal, to estimate a channel gain associated with the transmission path(s) of each user. Based on the estimated channel gain, the ULS utility is able to compute channel capacity. Based on capacity estimates of (1) the multiplexed user signals and (2) the individual user signals, signals are either multiplexed for UL SDMA or are transmitted individually. An optimal selection of multiplexed signals may be based upon: (1) a cross user interference estimate; and (2) a selection mechanism based on eigen-decomposition techniques. The ULS utility enables an UL scheduler to pair information signals with clear spatial distinction and minimal correlation, based on capacity evaluations.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to FIG. 1, a wireless communication system 100 which employs uplink collaborative SMDA is illustrated according to one embodiment of the invention. Communication system 100 comprises a number ("L") of users/subscribers, for example, user u 101, user 1 102 and user v 103, which all connect to a base station 106 via a number ("M") of receiving antennas (three shown—antenna 1 105, antenna 2 116, and antenna M 109. Base station 106 also may be referred to herein as an access point (AP). Base station 106 includes a transceiver having a receiver 107 and a transmitter (not shown). User u 101 utilizes a (single) mobile antenna u 108 to transmit an independent information/data signal to base station 106. As depicted in FIG. 1, each user (e.g., user u 101, user 1 102, and user v 103) transmits an independent information signal to base station 106 via "M" paths, for example, a channel path $h_{1,u}$ 104 that connects user u 101 to base station 106 via antenna 1 105, a channel path $h_{2,u}$ 104 that connects user u 101 to base station 106 via antenna 2 116, a channel path $h_{M,u}$ 104 that connects user u 101 to base station 106 via antenna M 109, and a channel path $h_{1,1}$ 111 that connects user 1 102 to base station 106 via antenna 1 105.

Users u 101, 1 102, and v 103 are able to transmit on the same channels various types of data in the form of images, video, speech, music, data, etc., and from various devices including cell phones, laptops, personal digital assistants (PDAs), game devices, etc. Communication system 100 may employ uplink (UL) collaborative SDMA, a characteristic of mobile WiMAX technology, in which two independent subscriber signals share the same sub-channel(s), that is, time-frequency resources. Base station 106 may receive signals from each of the "L" users on each of the "M" antennas.

In communication system 100, the multiple users, that is, users u 101, 1 102, and v 103, collectively transmit a signal vector "s" comprised of the independent information signals of the multiple users, that is, signal u ("su") corresponding to user u 101, signal 1 ("s1") corresponding to user 1 102, and signal v ("sv") corresponding to user v 103.

Receiver 107 comprises a Processor/DSP/Controller 118, a channel estimator 112, an estimated channel gain information module 122, a detector 117, an uplink scheduling (ULS) utility 110, and an uplink (UL) scheduler 113. Channel estimator 112 provides an estimate (utilizing Equation 301 of FIG. 3) of a channel transfer function vector. Estimated channel gain information module 122 estimates a gain or gains of a wireless channel. For example, estimated channel gain information module 122 may output a vector of channel gains or an averaged channel gain over a group of subcarriers. Detector 117 receives independent signal components x1, x2, and xM 119 of a signal as received at each of the multiple antennas as inputs and yields an output signal vector y 120. Detector 117 may be, for example, a minimum mean square error (MMSE) detector.

Among the software code/instructions/logic provided by UL scheduler 113, estimated channel gain information module 122, channel response estimator 112 and ULS utility 110, and which are specific to the invention, are: (a) logic for estimating a spatial channel response for a user within a UL SDMA system, based on uplink signals such as the CQI feedback signal and/or uplink sounding signal; (b) logic for determining whether a user signal is assigned to UL SDMA or UL single input multiple output (SIMO) transmission; and (c) logic for determining an optimal set of pairings, based on capacity calculations and other priority conditions. In one embodiment of the present invention, ULS utility 110 implements the functions of UL scheduler 113, estimated channel gain information module 122, and channel response estimator 112 and, for simplicity of the description, the collective body of code that enables these various features is referred to hereinafter as ULS utility 110. However, in other embodiments of the present invention, one or more of UL scheduler 113, estimated channel gain information module 122, and channel response estimator 112 may be a module separate from, and in communication with, ULS utility 110.

In communication system 100, the (M×1)-dimensional vector of complex signals, "x", received by the M-element antenna array in the k-th subcarrier of the n-th OFDM symbol is constituted by the superposition of the independently faded signals associated with the L users sharing the same time-frequency resource. Thus, "x" may also be referred to as "x[n;k]". The received signal is corrupted by noise ("n(p)" or "n") at the array elements. In the forthcoming description, the indices [n; k] have been omitted for notational convenience, yielding:

$$x = Hs + n, \quad \text{(Equation 1)}.$$

The frequency domain channel transfer function matrix "H" of dimension M×L is constituted by the set of channel vectors of the L users, each of which hosts the frequency domain channel transfer factors between the single transmitter antenna associated with a particular user, such as user v, and the receiver via the antenna array. Regarding the statistical properties of the components associated with the vectors in Equation 1, one may assume that the complex data signal transmitted by each user, such as signal s(v) transmitted by user v, has zero-mean and unit variance. The noise process n(p) at any antenna array element p exhibits zero-mean and a variance of $\sigma^2$. The frequency domain channel transfer function H(k) of the different users are different fading processes.

FIGS. 3A-3F illustrate a number of equations employed in the UL SDMA pairing methods according to one embodiment of the invention. In one embodiment of scheduling and pairing for uplink SDMA, UL SDMA receiver 107 facilitates the subsequent separation of the different users based on the unique channel transfer function vector as observed through an antenna array. An estimate of the channel transfer function vector, "H", is provided by a sub-carrier "k" frequency domain channel estimate (vector "$H(k)_u$") between user u and each receive antenna at base station 106. Vector "$H(k)_u$" may be determined empirically by a sounding processing methodology or estimated by using pilots embedded in uplink signals such as the CQI feedback signal.

However, in order to determine whether the pairs of user signals are transmitted via UL SDMA or SIMO, ULS utility 110 computes a "Φ-matrix." The Φ-matrix is a matrix of cross-user interference measurements, "Φ", between two users, that is, between a first user such as user u and a second user such as user v, on a sub-carrier k and across each of the M antennas, where "Φ" is provided by Equation 312:

$$\Phi = \sum_{k=1}^{K} \frac{\left| \sum_{i=0}^{M_r-1} h_{i0}^*(k) \cdot h_{i1}(k) \right|^2}{\left( \sum_{i=0}^{M_r-1} h_{i0}^*(k) \cdot h_{i0}(k) \right) \cdot \left( \sum_{i=0}^{M_r-1} h_{i1}^*(k) \cdot h_{i1}(k) \right)} \quad \text{(Equation 312)}$$

For users utilizing multiple ("K") subcarriers, the "Φ-matrix" can be defined as an average over the "K" subcarriers.

ULS utility 110 pairs and schedules information signals that have a minimal correlation for UL SDMA. Thus, in the context of detector 117 (e.g., a MMSE detector), the selected pairings ultimately increases an ability of the detector to distinguish/de-correlate and recover each one of the individual transmitted signals from the received signals.

In order to facilitate an explanation of the UL SDMA process, a communication environment with an antenna array comprising a number "Mr" of receive antennas and two (2) single transmit users, that is, users' mobile devices, with a flat channel is considered. The SDMA transmission may be modeled as shown in Equation 301:

$$\begin{bmatrix} y_1 \\ y_2 \\ \vdots \\ y_{Mr} \end{bmatrix} = \begin{bmatrix} h_{1,1} & h_{1,2} \\ h_{2,1} & h_{2,2} \\ \vdots & \vdots \\ h_{Mr,1} & h_{Mr,2} \end{bmatrix} \begin{bmatrix} s_1 \\ s_2 \end{bmatrix} + \begin{bmatrix} n_1 \\ n_2 \\ \vdots \\ n_{Mr} \end{bmatrix}. \quad \text{(Equation 301)}$$

The vector $[s_1 \ s_2]^T$ is the signal vector consisting of the transmitted modulated symbols from each user. The vector $[n_1 \ldots n_{Mr}]^T$ is the noise vector at the receive antennas. Vector $[y_1 \ldots y_{Mr}]^T$ is the received signals vector at the receive antennas. The channel transfer function, H, may be represented as shown in Equation 302:

$$H = \begin{bmatrix} h_{1,1} & h_{2,1} & \ldots & h_{Mr,1} \\ h_{1,2} & h_{2,2} & \ldots & h_{Mr,2} \end{bmatrix}. \quad \text{(Equation 302)}$$

where each entry $h_{i,j}$ is the complex channel gain from a $j^{th}$ transmit antenna, that is, a $j^{th}$ user, to an $i^{th}$ receive antenna. This flat channel, multiple input multiple output (MIMO) model may be applied to each sub-carrier in the uplink. The variance of the received noise including interference satisfies equation 303.

Using a minimum mean square error (MMSE) receiver with interference cancellation (MMSE-SIC) on a received signal $y_i$, a per tone signal to interference plus noise ratio (SINR) for a data stream of the first user of the two users, that is, $SINR_0$, after canceling the interference from the second stream, is provided by equation 304, where the parameters "B", "E", "F", and "D" are described by Equations 305, 306, 307 and 308, respectively, and "$\eta$" is a cancellation factor that falls in a range $0 \leq \eta \leq 1$. Equation 304 is equivalent to equation 311 which is, in turn, dependent upon "$\Phi$" (equation 312), the normalized covariance of channel response associated with two mobile devices. Normalization is facilitated by the (pair of) terms illustrated in the denominator of equation 312. These terms represent the single channel covariance of the two individual users. In addition, Equations 313 and 314 represent the SINR associated with the signals of the two users, or mobile devices, without intra-cell user interference. In equation 311, if $\eta=1$, the receiver is MMSE without interference cancellation, while $\eta=0$ corresponds to perfect interference cancellation and equation 304 becomes equation 316. A per tone SINR for a data stream of the second user of the two users, that is, $SINR_1$, is provided by equation 317, where "A" is described by Equation 318. Equation 317 is equivalent to equation 319 which is also dependent upon "$\Phi$" (equation 312), the normalized covariance of channel response associated with two mobile devices.

In UL scheduling and optimal pairing of users for SDMA, "$\Phi$" (equation 312) is used to schedule the two least correlated users, or mobile devices, in a same slot. Scheduler 113 at base station 106 maintains, and updates at every scheduling instance, a matrix whose (i, j) element corresponds to the "$\Phi$" (equation 312) between a mobile 'i' and a mobile 'j.'

Based on the estimated channel response associated with each mobile device, the associated correlations "$\Phi$" (equation 312) and the receiver type (interference cancellation, or non-interference cancellation), scheduler 113 decides which mobile devices to pair together and whether to apply SDMA to the pair of mobile devices, based on a set of SDMA switching conditions. For example, suppose 'mobile 0' is scheduled to transmit and 'mobile 1' is the paired mobile device. Based on the respective SINR in Equations 311 and 319, mobile 0 and mobile 1 may transmit at the same time (SDMA) when the (first) SDMA switching condition in equation 321 is satisfied. In Equation 321, $\alpha$ and $\beta$ are constants that are chosen to approximate the system throughput based on capacity calculations. Equation 322 is a simplification of equation 321. In addition, SDMA is applied only when the (second) SDMA switching condition of equation 323 is also satisfied. In equation 323, the parameter "$\psi$" represents the preset minimum SINR for SDMA. In other words, switching to SDMA occurs if the aggregate SDMA throughput is greater than or equal to the single user maximum available throughput provided that both users are maintained at a minimum required SINR "$\psi$" required by equation 323. Scheduler 113 may execute a similar search for a 'mobile 2,' a 'mobile 3,' and so on (sequentially through the list of possible matches). If no mobile device satisfies equation 322 and equation 323 at the same time, scheduler 113 may select mobile 0 for single signal assignment to a sub-channel for UL transmission, that is, to transmit without SDMA; otherwise, the mobile device having the highest total throughput with mobile 0 using SDMA may be paired with mobile 0 and scheduled for UL transmission.

The aforementioned pairing and scheduling method may be extended to frequency-selective channels by using an averaged or effective SINR to represent the vector of the SINRs over the group of subcarriers. One embodiment of computing the effective SINR over subcarriers 1 through N is $$SINR_{0,effective}^{MIMO} = \frac{1}{\beta}\left(\exp\left(\frac{1}{N}\sum_{i \in [1 \ldots N]} \log(1 + \beta \cdot SINR_0^{MIMO}[i])\right) - 1\right)$$

$$SINR_{1,effective}^{MIMO} = \frac{1}{\beta}\left(\exp\left(\frac{1}{N}\sum_{i \in [1 \ldots N]} \log(1 + \beta \cdot SINR_1^{MIMO}[i])\right) - 1\right)$$

$$\vdots$$

and $$\hat{S}INR_{0,effective}^{MIMO} = \frac{1}{\beta}\left(\exp\left(\frac{1}{N}\sum_{i \in [1 \ldots N]} \log(1 + \beta \cdot \hat{S}INR_0^{MIMO}[i])\right) - 1\right)$$

Then the $SINR_0^{MIMO}$, $SINR_1^{MIMO}$ and $\hat{S}INR_0^{MIMO}$ in equations 321, 322 and 323 are replaced by $SINR_{0,effective}^{MIMO}$, $SINR_{1,effective}^{MIMO}$ and $\hat{S}INR_{0,effective}^{MIMO}$ respectively.

In another embodiment of scheduling and pairing for uplink SDMA, a "global optimized pairing" method/solution, two additional pairing algorithms to find an optimal pair of mobile devices to be spatially multiplexed based on channel capacity are described. In order to facilitate a description of the "global optimized pairing" method/solution, the composite channel matrix from spatial multiplexing of users 'i' and 'j' may be denoted as shown in equation 326:

$$H(i,j) = \begin{bmatrix} h_{1,i} & h_{2,i} & \ldots & h_{Mr,i} \\ h_{1,j} & h_{2,j} & \ldots & h_{Mr,j} \end{bmatrix}^T. \quad \text{(Equation 326)}$$

Then the optimal pairing (for a multiplexing order of 2) may be expressed as shown in equation 327:

$$(m,n) = \arg\max_{i,j \in [1 \ldots N], i \neq j} \log_2 \det\left(I + \frac{E_s}{N_0} H(i,j) H^H(i,j)\right) \quad \text{(Equation 327)}$$

where 'm' and 'n' are indices to the two mobile devices being paired, that is, mobile m and mobile 'n'. Equation 327 depicts a global optimization solution and requires searching every possible pair of mobile devices to find the optimal pair of mobile devices (m,n).

Searching every possible pair of mobile devices to find the optimal pair of mobile devices can be time consuming and processing intensive. Therefore, in order to save time and processing load, a "Max-Max pairing" method may be used that simplifies the global optimization solution by changing the 2-dimensional optimization to two one-dimensional optimizations. A first step of the "Max-Max pairing" method comprises selecting a first mobile having the highest SIMO capacity. Denoting $$H(i) = [h_{1,i} h_{2,i} \ldots h_{Mr,i}]^T \quad \text{(Equation 328)}$$

as the channel vector for an $i^{th}$ user, or mobile, a mobile 'm' with the highest SIMO capacity is obtained via equation 329:

$$m = \arg\max_{i \in [1 \ldots N]} \log_2 \det\left(1 + \frac{E_s}{N_0} H^H(i)H(i)\right). \quad \text{(Equation 329)}$$

The next, second step is to find a second, matching mobile 'n' (i.e., a second element to complete the pair) for the first mobile 'm' found in the first step. That is, the second step is to find a solution, that is, mobile 'n,' via equation 330:

$$n = \arg\max_{j \in [1 \ldots N], j \neq m} \log_2 \det\left(I + \frac{E_s}{N_0} H(m, j)H^H(m, j)\right). \quad \text{(Equation 330)}$$

The aforementioned pairing solutions, that is, the "global optimized pairing" solution and the "Max-Max pairing" solution, assume a flat channel, which may be expressed as a MIMO channel matrix. For OFDM signaling in a frequency-selective channel, each sub-carrier may have a different MIMO channel matrix. Thus, the associated pairing schemes (e.g., per-subcarrier pairing) do consider the different channel conditions on each sub-carrier. Considering pairing over an OFDM channel and extending the global optimized pairing solution to a multiple sub-carriers channel, the previously described "global optimized pairing" principle still applies except that the optimization object is the aggregated capacity over the multiple sub-carriers. Denoting the composite channel matrix between $i^{th}$ and $j^{th}$ users in kth sub-carrier as:

$$H_k(i, j) = \begin{bmatrix} h_{1,i} & h_{2,i} & \ldots & h_{Mr,i} \\ h_{1,j} & h_{2,j} & \ldots & h_{Mr,j} \end{bmatrix}^T, \quad \text{(Equation 331)}$$

then the optimization problem can be expressed as:

$$(m, n) = \arg\max_{i,j \in [1 \ldots N], i \neq j} \sum_k \log_2 \det\left(I + \frac{E_s}{N_0} H_k(i, j)H_k^H(i, j)\right). \quad \text{(Equation 332)}$$

Simplification of pairing over multiple sub-carriers may be achieved by using only spatial channel information irrespective the sub-carrier. This simplification may be achieved via a feasible assumption that the spatial characteristics are similar across the sub-carriers in the whole band. This assumption is particularly realistic when the antenna array deployed by a base station, such as base station 106, is a correlated array with one-half wavelength antenna spacing. This solution may be referred to as "wide-band pairing" to differentiate this solution from the previously introduced per-sub-carrier pairing.

Pairing eigen-beams is one implementation of wide-band pairing. Given, for one user (e.g., user 1), the frequency response for each receive antenna, a correlation matrix may be obtained by averaging the frequency responses over the whole set of sub-carriers (assuming 'K' sub-carriers), as illustrated by equations 336, 337:

$$R(i) = \frac{1}{K} \sum_{k=1}^{K} H_k^H(i)H_k(i) \quad \text{(Equation 336)}$$

$$R(i) = V(i)^H \Lambda V(i), V \in C^{Mr \times Mr} \quad \text{(Equation 337)}$$

where "R" is the channel covariance matrix and $V \in C^{Mr \times Mr}$ describes V as an "Mr×Mr" (dimensional) channel matrix of eigenvectors of R over complex field C. As indicated by equations 336 and 337 above, the Eigen-decomposition produces a diagonal matrix, Λ, representing the beam gain and a unitary matrix, V(i), each column vector of which represents the spatial channel for an eigen-beam. Without repeated calculations on every sub-carrier, the simplified "global-optimal" solution may be applied, i.e., searching every pair of possible mobile devices, to achieve the best possible performance.

The previously introduced pairing methods (e.g., the global optimized pairing solution and the Max-Max pairing solution) may be applied to these eigen-vector spatial channels to measure the orthogonality between them. However, as the eigen-decomposition produces multiple eigen-vectors corresponding to the MIMO channel between one mobile device and the base station, a number of methods may be employed to facilitate the solution.

In a "Maximum Capacity over Maximal Eigen-Beam (Global Max-beam Wide-band (WB))" solution, for each link between a mobile device and a base station receive antenna, an eigen-beam corresponding to the largest eigenvalue is chosen to represent the link's spatial channel. This solution may work for any number of receive antennas. Denoting $V_{max}(i) \in C^{Mr \times 1}$ as the eigen-vector corresponding to the greatest eigen-value $\lambda_{max}(i)$ of R(i) for an $i^{th}$ user, and representing the spatial channel for this user by the transfer function:

$$\tilde{H}(i) = \sqrt{\lambda_{max}(i)} V_{max}(i) \quad \text{(Equation 338)},$$

a channel matrix for the $i^{th}$ and $j^{th}$ users may be constructed as $$\tilde{H}(i,j) = [\tilde{H}(i) \ \tilde{H}(j)] \quad \text{(Equation 339)}.$$

Then the solution for the mobile pairing may be expressed as:

$$(m, n) = \arg\max_{i,j \in [1 \ldots N], i \neq j} \log_2 \det\left(I + \frac{E_s}{N_0} \tilde{H}(i, j)\tilde{H}^H(i, j)\right). \quad \text{(Equation 340)}$$

A "Maximum Average SINR over all Eigen-Beams (Global Max-SIR WB)" solution also may be considered. When the number of receive antennas is large (e.g., 8 receive antennas) and the distribution of the eigen-values is not singularized, the previous pairing solution may be enhanced to provide an estimation of a MIMO channel, more relevant in such an environment. The previously described Global Max-beam WB pairing algorithm considers the strongest eigen-beam.

An enhancement of the Global Max-beam WB pairing solution for SDMA transmission considers all incident beams for both users of a pairing by measuring the mutual interference.

A reasonable metric for measuring the mutual interference is the SINR per each incident eigen-beam, considering the interfering eigen-beams from the other user of a pair of users. Consider γ(i,m) as the SINR for an $m^{th}$ incident eigen-beam for an $i^{th}$ user. It is worth noting that after eigen-decomposition, the obtained incident eigen-beam from the same $i^{th}$ user no longer constitutes interference. Then γ(i,m) may then be calculated as:

$$\gamma(i, m) = \frac{\lambda_m(i)}{\frac{1}{Mr}\sum_{n=1}^{Mr}\lambda_n(j)V_m^H(i)V_n(j) + \sigma^2}. \quad \text{(Equation 341)}$$

The objective function is the total SINR summed up over all eigen-beams from both users, that is, $$\Gamma(i, j) = \sum_{m=1}^{Mr}\gamma(i, m) + \sum_{m=1}^{Mr}\gamma(j, m). \quad \text{(Equation 342)}$$

Then the optimization solution may be expressed as follows:

$$(m, n) = \arg\max_{i,j \in [1 \ldots N], i \neq j}\Gamma(i, j). \quad \text{(Equation 343)}$$

Those of ordinary skill in the art will appreciate that the hardware and basic configuration depicted in FIG. 1 may vary. For example, other devices/components may be used in addition to or in place of the hardware depicted. The depicted example is not meant to imply architectural or other limitations with respect to the present invention.

Figure 2:
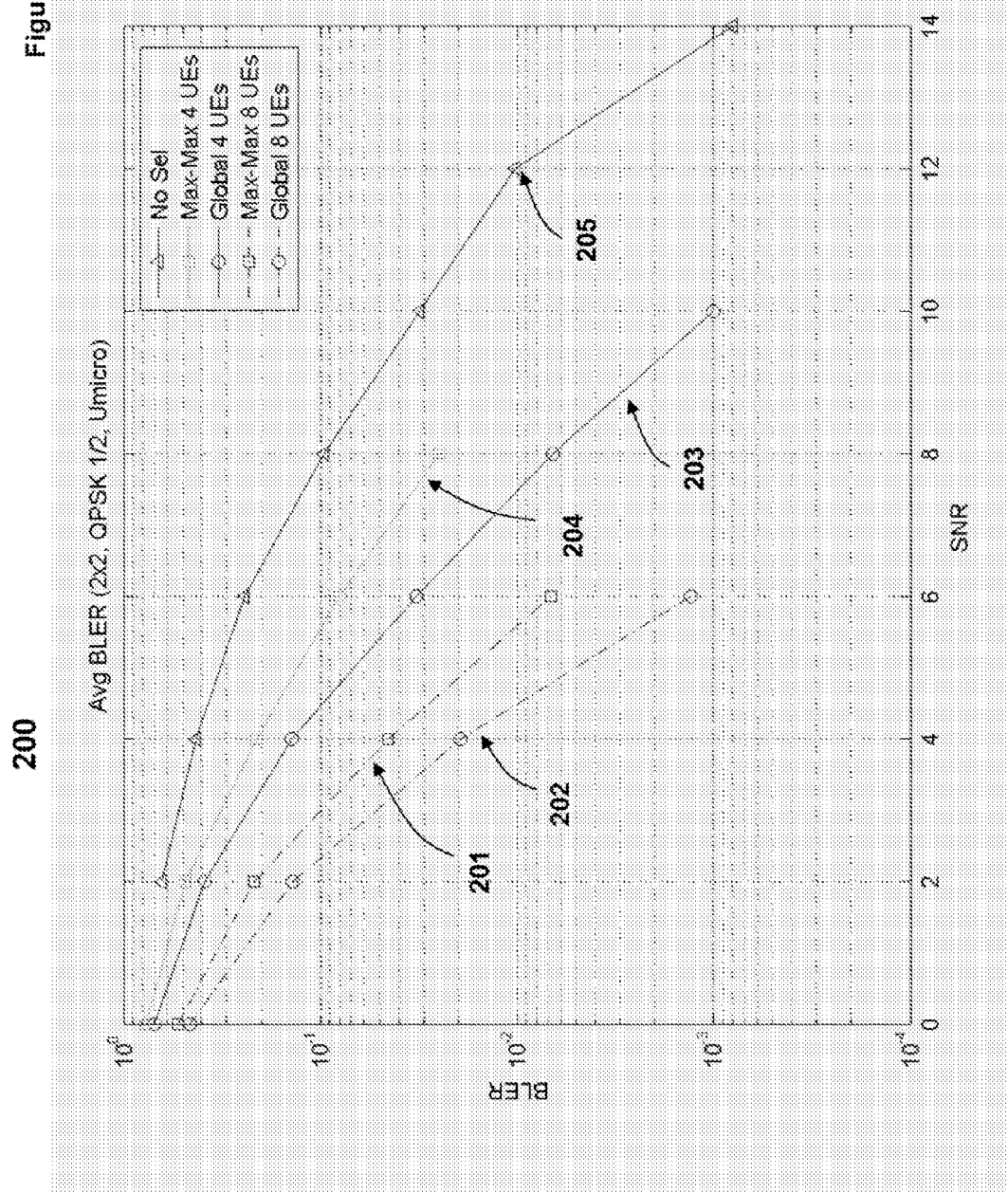
FIG. 2 is a graph illustrating the average block error rate(s) (BLER) of various pairing schemes according to one embodiment of the invention.
Figure 4:
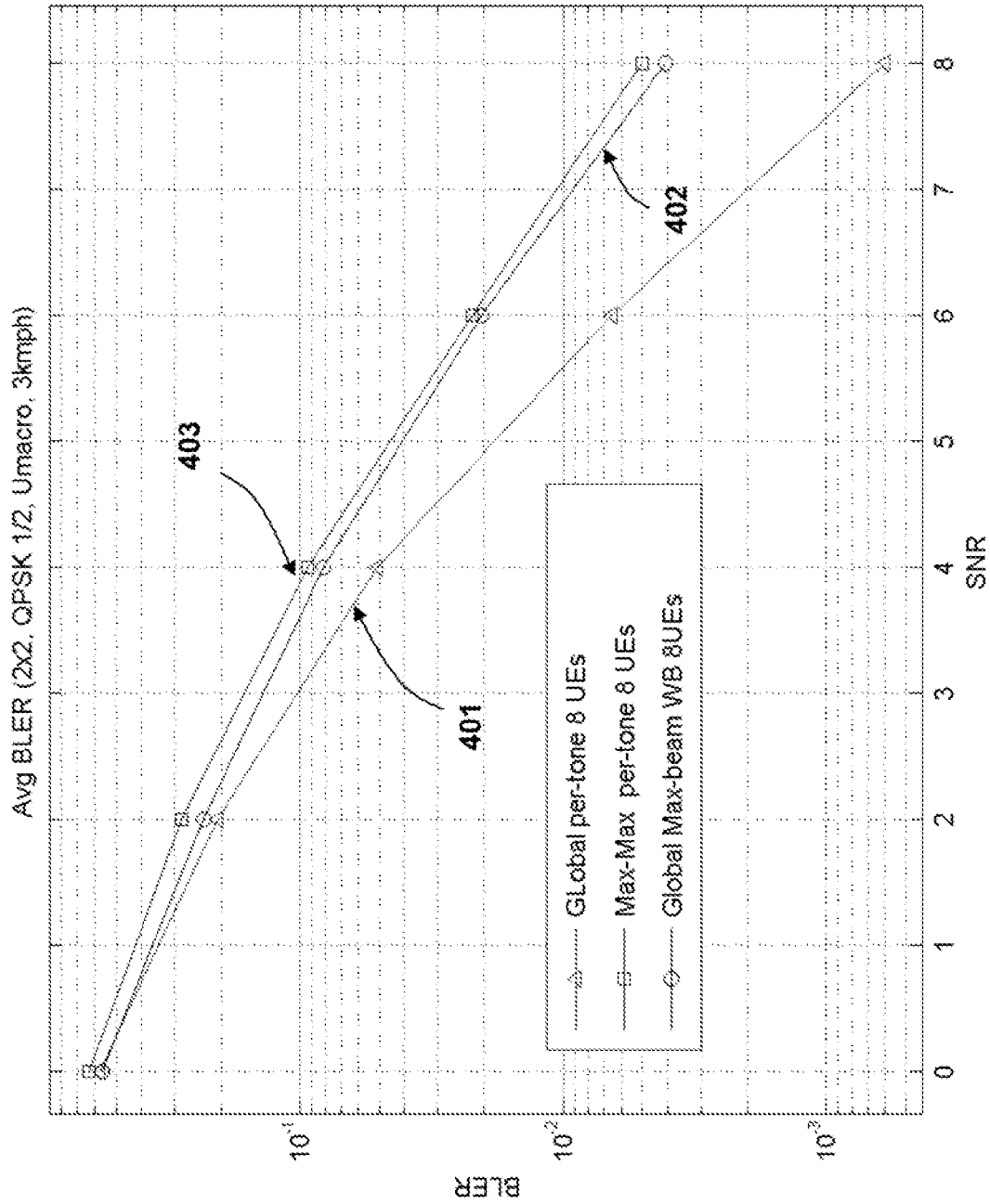
FIG. 4 is another graph illustrating the average block error rate(s) (BLER) of various pairing methods according to one embodiment of the invention.

The performance gain attained by the UL collaborative SDMA scheduling method with the implementation of various pairing methods is demonstrated by the simulation results presented in the following figures. FIG. 2 and FIG. 4 show block error rate (BLER) results for various paring methods.

SDMA pairing requires knowledge of uplink channels of mobile devices. The knowledge of uplink channel may be obtained by an uplink signal, such as a channel quality indicator (CQI) feedback signal and/or an uplink sounding signal.

In FIGS. 2 and 4, the average BLER performance (averaged over multiple SDMA mobile devices) is evaluated for pairing algorithms using the non-pairing performance as a baseline. A number of SDMA methods are compared, including non-pairing (randomly selecting spatial multiplexing mobile devices), global optimized pairing and Max-Max pairing. Partial Usage of Sub-Carriers (PUSC) 5 slots configuration is simulated with both of the spatial multiplexed mobile devices having the same modulation code scheme (MCS) (QPSK with ½ coding rate) for both urban macro and urban micro channel. It is worth noting that in the simulation, the channel sounding results are modeled as a frequency domain channel response with added white noise giving 9 dB and 2 dB channel sounding SNR per receive antenna.

FIG. 2 is a graph 200 illustrating the average BLER of various pairing methods, according to one embodiment of the invention. Graph 200 comprises five waveforms illustrating the average BLER for the corresponding methods for UL data transmission. A random pairing waveform 201 displays the BLER results for a random signal pairing. Graph 200 includes a first Max-Max pairing waveform 202 and a first Global pairing waveform 203 given four (4) users/mobile devices are transmitting data, in both cases. In addition, graph 200 includes a second Max-Max pairing waveform 204 and a second Global pairing waveform 205 given eight (8) users/mobile devices are transmitting data, in both cases.

In graph 200, the link performance for a two receive antenna configuration is illustrated. The average BLER comparing different pairing strategies without modeling the channel response staleness is shown. Compared to the baseline scheme, i.e., randomly selected mobile devices, performing pairing achieves better BLER because the spatial multiplexed mobile devices have large spatial separation. As illustrated in graph 200, BLER results for random pairing, as illustrated by random pairing waveform 201, shows inferior performance compared to other "intelligent" pairing methods, as illustrated by waveforms 202, 203, 204, and 205. By intensive/brute-force searching, the maximal MIMO capacity achieved by global optimized pairing may be relatively higher than the performance levels achieved by 2 one-dimensional searching (in a "simplified" optimal pairing method). For searching among four mobile devices, the SNR gain between no-pairing and simplified optimal pairing, which includes the Max-Max pairing method illustrated via first Max-Max pairing waveform 202, is 2 dB and an extra 2 dB of gain is obtained for global optimized pairing, as illustrated by first Global pairing waveform 203.

As indicated by capacity calculations, the spatial distance between the channel vectors from the pair of mobile devices has a major impact on the resulting MIMO capacity. When chosen from a larger population, therefore, the paired mobile devices have a larger spatial distance, which is attributed to the user diversity. The exact gain due to this user diversity depends on the environment. As observed within graph 200, first Max-Max pairing waveform 202 and first Global optimized pairing waveform 203 represent a four (4) user/mobile device environment. Second Max-Max pairing waveform 204 and second Global optimized pairing waveform 205 represent the eight (8) user/mobile device environment. A comparison of the 4 user/mobile device and 8 user/mobile device environments highlights an SINR gain (of the 8 user/mobile device environment) that is attributable to user diversity.

It is also important to observe the effects of channel state staleness. This channel state staleness arises because the sounding is only performed once every preset number of frames (e.g., 8 times) for each user. Assuming a worst case scenario, all users' channel state has 8 frames delay. In practice, only 8 out of 64 users experience such delay and the other users experience delay varying from less than 1 frame to 8 frames delay depending on the time being scheduled with respect to the timing of sounding.

Results indicate that with 3 kmph mobility, around 7 Hz Doppler frequency, the global optimized pairing suffers less than 0.5 dB degradation from channel state staleness whilst the max-max pairing experiences negligible degradation. Global optimized pairing is more sensitive to the channel state staleness.

Compared to the two receive antenna case, the gain of pairing with eight receive antennas is less significant (2 dB for four mobile devices global optimized pairing algorithm). This is due to the fact that the eight receive antenna case has better spatial resolution, which may work on lower spatial separation region than the two receive antenna case. Therefore, the gain by increasing spatial separation by pairing is saturated with a given BLER target. Considering the impact of channel state information (CSI) delay, eight receive antenna is less sensitive to the CSI error, which is also due to the fact that in the eight receive antenna case there is better spatial resolution.

Since with the eight receive antennas deployed the coverage is extended, the supportable sounding SNR for cell edge users is reduced. Assuming 2 dB sounding SNR for the eight receive antenna case and comparing the performance loss (in the case without sounding delay) against a 9 dB sounding SNR case indicates that the degradation due to reduction of sounding SNR is more severe for searching among eight mobile devices with the global-optimal method. This is understandable because finer channel information (achieved by higher sounding SNR) may be only better exploited when the searching population is large and thorough. The performance degradation is around 1 dB, which indicates that 2 dB sounding SNR may provide enough spatial channel information to be exploited by pairing algorithms.

FIG. 4 is a graph 400 illustrating the average BLER of various pairing methods including an eigen-beam pairing method, according to one embodiment of the invention. Graph 400 comprises three waveforms illustrating the average BLER for the corresponding waveforms for UL data transmission, that is, a Global per-tone pairing waveform 401, a Global Max-beam WB pairing waveform 402, and a Max-Max per-tone pairing waveform 403. Graph 400 illustrates results for simulations in which eight (8) mobile users are transmitting data, in all cases. The simulation results illustrated within graph 400 use the 2 dB sounding SNR with two receive antennas in an urban macro environment.

For two receive antennas, one simplified OFDM channel pairing scheme, i.e., the maximal capacity over max eigen-beam (referred as Global Max-beam WB 8 mobile devices) is compared with the direct extension schemes. The BLER curves show that wide-band pairing achieves similar and even better performance at $10^{-2}$ BLER position as the per-tone pairing scheme with greatly reduced complexity. In particular, Global Max-beam WB pairing waveform 402 indicates better performance than Max-Max per-tone pairing waveform 403. Similar result trends may be achieved in an eight antenna case.

For eight receive antennas, two simplified pairing schemes, i.e., maximum capacity over max eigen-beam, referred as Global Max-beam WB 8 mobile devices, and maximum average SINR, referred as Global Max-SIR WB 8 mobile devices, may be compared with respective reference to the direct extension to OFDM schemes. Performance results indicate that, similar to the performance in the two receive antenna case, wide-band pairing achieves similar and even better performance at $10^{-2}$ BLER position as the per-tone pairing scheme with greatly reduced complexity. One of the reasons for a better performance is that under a realistic channel estimation, the correlation matrix estimated by averaging over all sub-carriers provides better spatial channel information on a per-tone approach. Additionally, maximizing the SINR using all eigen-beams gives a better performance when compared to only using the maximal eigen-beam to represent the spatial channel from one user. The results show that exhaustive searching over all possible pairs yields the best results because this searching method evaluates both the channel strength as well as the possible interference due to the spatial multiplexing.

The pairing process has a prohibitive complexity when applied to OFDM channels due to the iterations incurred in pairing and the sheer number of sub-carriers, which all require the same searching process. Simplifications may be achieved by representing the spatial channel across all sub-carriers with eigen-vectors. There are multiple advantages of doing this simplification. The pairing process per sub-carrier over the whole band is reduced to perform a single iteration on eigen-beams and, therefore, a global multiple-dimensional search becomes affordable, which yields the best performance. Secondly, using eigen-vectors to represent the OFDM spatial channel reduces the storage required for scheduling. For the users in the scheduler queue, instead of the spatial channel over all sub-carriers, a single eigen-matrix may be saved.

Therefore, optimal pairing may be performed during the scheduling stage if spatial multiplexing is supported on the uplink transmission. Channel sounding results may be used as the means to estimate the spatial channel of all users and the spatial channel information is stored using the eigen-decomposition results. For eight receive antennas, maximizing the average SINR may achieve the best performance, while for two receive antennas, maximizing capacity using the max eigen-beam per users may achieve reasonable performance.

In general, performance results indicate that significant improvement on sector throughput and even greater improvement on user throughput may be achieved when using optimal pairing over random pairing with a 1×3×3 frequency reuse scheme (FRS) for UL transmissions (e.g., File Transfer Protocol (FTP)). In addition, the optimal pairing significantly reduces the HARQ retransmissions. The improvement of optimal pairing is significantly less with a 1×4×2 FRS than the 1×3×3 FRS since the system having the 1×4×2 FRS is more affected by other cell interference. In general, the gain of optimal pairing is most significant when the system is fully loaded, i.e., when the transmission frame is fully utilized and the cross user interference is dominant.

With UL VoIP traffic, however, the improvement of using optimal pairing is not as significant. This is due to the fact that the VoIP performance is mainly affected by the users at cell boundaries with lower SINR. SDMA (random and optimal pairing) techniques improve throughput for users with suitable channel conditions.

Figure 5:
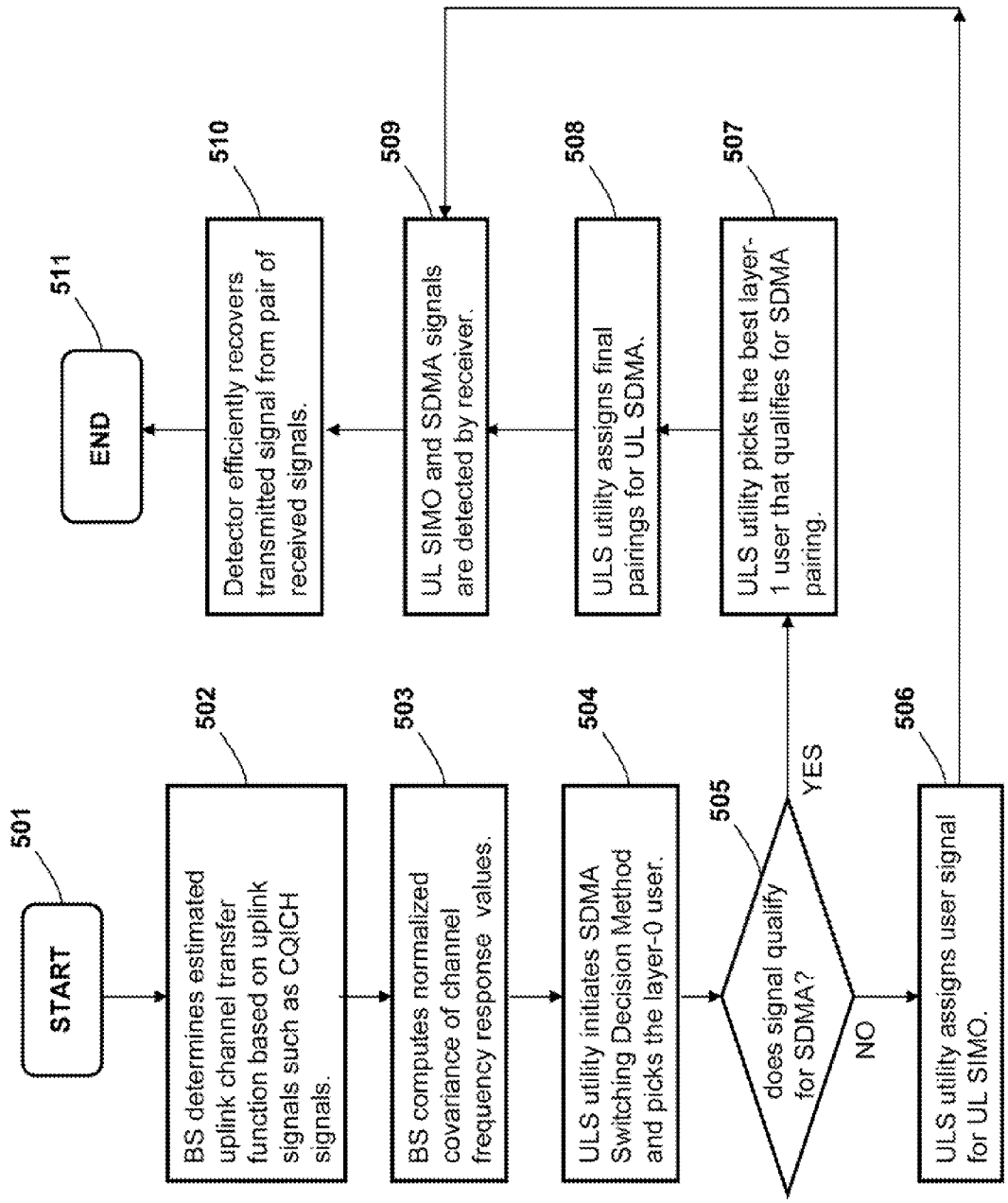
FIG. 5 is a flow chart illustrating UL SDMA pairing methods according to one embodiment of the invention.

FIG. 5 is a flow chart illustrating a method by which the above processes of the illustrative embodiments are completed. Although the method illustrated in FIG. 5 may be described with reference to components shown in FIGS. 1-4, it should be understood that this is merely for convenience and alternative components and/or configurations thereof can be employed when implementing the various methods. Key portions of the methods may be completed by ULS utility 110 executing within system 100 (FIG. 1) and controlling specific operations of/on system 100, and the method is thus described from the perspective of either/both ULS utility 110 and system 100.

The process of FIG. 5 begins at initiator block 501 and proceeds to block 502, at which channel response estimator 112 determines the estimated uplink channel transfer function based on uplink signals, such as a CQI feedback signal, corresponding to the signal paths of a number ("L") of users, such as user u 101, user 1 102, and user v 103. In system 100, each of the 'L' users transmits information signals that are received by the multiple 'M' antennas of a receiving base station, that is, base station 106. At block 503, ULS utility 110 computes a normalized pairing metric which allows a UL scheduler, such as UL scheduler 113, to select a compatible set of signal pairings for UL collaborative SDMA. At block 504, a ULS utility, such as ULS utility 110, initiates a decision as to whether to employ UL SDMA or single user UL transmission.

The decision concerning whether to employ 2-user UL SDMA or single user UL transmission is determined by the outcome(s) of a number of channel capacity evaluations.

These evaluations are based on mathematical models/equations which predicts/estimates (1) the aggregate throughput of each one of two signals combined as a candidate pairing for application within SDMA and (2) the single user maximum available throughput. A major component of the mathematical equations is the computed Φ values, i.e., the cross user interference. Selecting a candidate pair for SDMA is decided if the aggregate SDMA throughput is greater than or equal to the single user maximum available throughput, as illustrated by equation 322. In addition, SDMA is applied only when both users are maintained at the minimum required SINR, as illustrated by equation 323.

In one embodiment, satisfaction of the conditions expressed within equations 322 and 323 enable the user signals to be applied for UL SDMA. However, a qualification for UL SDMA may not definitively determine the actual user pairings. In fact, a particular user, for example, user 1, may be paired with multiple different signals and may be able to satisfy equations 322 and 323. In these pairings, user 1 may be regarded as a 'layer 0' user and the various potential matches are the 'layer 1' co-user options. The final SDMA and pair decision is made by picking a particular 'layer 1' user such that the combined throughput of this 'layer 1' user and the 'layer 0' user is maximized.

Conversely, when equations 322 and 323 are not satisfied for a pair of users, each of the users may separately contend for UL SDMA with other co-user options. A failure of a particular pairing to satisfy equations 322 and 323 simply prevents that particular pairing to be applied together for UL SDMA. If each user continues to fail the qualifying conditions with all other pairing options, the users signals may be prevented from employing UL SDMA and instead may be transmitted via UL SIMO.

Returning to the flow chart, at block 505 ULS utility 110 determines whether one or more user signals qualify for UL SDMA. If at block 505, ULS utility 110 determines that one or more user signals do not qualify for UL SDMA, the process proceeds to block 506, at which ULS utility 110 assigns only one user to a particular time-frequency resource for UL transmission. Following block 506, the process proceeds to block 509. If, at block 505, ULS utility 110 determines that one or more user signals qualify for UL SDMA, the process proceeds to block 507, at which ULS utility 110 applies a pairing method to users that qualify for SDMA pairing.

At block 508, ULS utility 110 selects the final pairings for UL SDMA. In addition, ULS utility 110 factors any other priority considerations, for example, quality of service (QoS) requirements, into the selection of the final pairings. The selected SDMA signal pairs and SIMO signals utilize the appropriate time-frequency resources, that is, OFDM symbols and sub-carriers, and are detected at a number of antennas at receiver 107, as shown at block 509. At block 510, detector 117 of receiver 107 is able to efficiently recover transmitted SIMO signals and SDMA signals from received signals. Detector 117 is able to distinguish each of the individual signals in the SDMA pairing as a result of the selection process utilized by ULS utility 110 which pairs signals which have a clear spatial distinction. The process ends at block 511.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. The methods of the invention may be practiced by combining one or more machine-readable storage devices containing programming code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a wireless communication system employing uplink (UL) spatial division multiple access (SDMA), a method comprising:

measuring, at a base station, an uplink channel transfer function between at least a first single user of a plurality of users and each receive antenna of the base station based on received uplink (UL) signals corresponding to the plurality of users;

representing the uplink channel transfer function using eigen-vectors;

obtaining a normalization of a covariance of channel responses associated with the plurality of users;

determining when a signal is transmitted via UL SDMA, based on one or more SDMA switching conditions;

when one or more of the SDMA switching conditions are not satisfied, identifying a signal for single signal assignment to a sub-channel for UL transmission to the base station; and when one or more of the SDMA switching conditions are satisfied, selecting at least a pair of users from the plurality of users and allocating multiple signals on same time-frequency resources to the selected pair of users for transmissions to the base station using SDMA, wherein the one or more SDMA switching conditions comprise switching to SDMA when an aggregate SDMA throughput of the selected pair of users is greater than or equal to a throughput of the first single user.

2. The method of claim 1, wherein said measuring further comprises estimating the uplink channel transfer function with an application of one or more of:
- a received uplink control channel signal to a channel estimation facility at the base station; and
- a received uplink data channel signal to the channel estimation facility at the base station.

3. The method of claim 2, wherein said estimating further comprises:
- obtaining an estimated composite channel response for the set of users;
- obtaining an estimated single channel response vector for an individual signal within the set of users;
- obtaining an estimated composite channel frequency response for the set of users; and
- updating a plurality of correlation values from an average of the estimated composite channel frequency response for a particular user within the set of users.

4. The method of claim 1, wherein said obtaining further comprises:
- determining a single channel covariance for a plurality of single users, respectively;
- computing a covariance of channel response on sub-carriers for UL SDMA corresponding to a plurality of users;
- calculating the normalization of the covariance of channel response based on the single channel covariance and the covariance of channel response for UL SDMA;
- maintaining a matrix of the normalized covariance of channel response between one or more users; and
- periodically updating the matrix of the normalized covariance of channel response.

5. The method of claim 1, wherein said determining further comprises:
- estimating the throughput of the first single user being allocated to a sub-channel;
- obtaining an estimated aggregate total of throughput of user signals multiplexed together within a sub-channel;
- wherein calculations of said throughput corresponding to the first single user and said aggregated total throughput corresponding to the multiplexed user signal depend upon the normalized covariance of channel response;
- selecting UL SDMA for a second user when all of a plurality of SDMA switching conditions are satisfied, said conditions including:
  (a) the estimated aggregated total of throughput is greater than or equal to the maximum available throughput of the single signal allocated to the sub-channel;
  (b) the individual signals within the group of multiplexed signals are individually maintained at a minimum preset SINR; and
  (c) the estimated aggregated total of throughput of the first user and the second user is greater than or equal to the estimated aggregated total of throughput of the first user and any other user that satisfies conditions (a) and (b) above;
- wherein the first user is automatically selected when the second user is selected; and
- when the SDMA conditions are not satisfied, assigning the first user to single input multiple output (SIMO) transmission.

6. The method of claim 1, wherein said representing further comprises:
- obtaining a set of eigen-beams comprising eigenvectors and eigenvalues provided by an eigen-decomposition, based on the plurality of correlation values;
- identifying an eigen-vector having the largest eigen-value, for a particular user signal;
- a representation of a single spatial channel response based on the largest eigen-value and the corresponding eigen-vector associated with the single spatial channel; and
- a representation of a composite spatial channel response comprised of representations of the single spatial channel responses.

7. The method of claim 1, wherein said determining further comprises:
- identifying the pair of user signals having the maximum SINR value among a plurality of SINR values defined from: (a) a total SINR summed up over all eigen-beams corresponding to a set of multiplexed user signals; and (b) a plurality of eigen-beams corresponding to associated spatial channels for corresponding user signals.

8. The method of claim 1, wherein said determining further comprises:
- a calculation which identifies the pair of user signals having a higher MIMO capacity value for UL SDMA selection, relative to other unselected user pairs, wherein neither one or more individual signals of an identified user pair nor one or more individual signals of the other unselected user pair is previously identified for UL SDMA selection; and
- one or more calculations which initially identifies a single user signal with high SIMO capacity relative to other user signals and secondly identifies a matching user signal, for the single user signal, in order to obtain a larger MIMO capacity level for UL SDMA selection, relative to other pairings which include the single user signal.

9. The method of claim 1, wherein said one or more SDMA switching conditions are based on one or more of the normalized covariance of channel response corresponding to the plurality of users, an aggregate throughput of signals of two or more users of the plurality of users combined as a candidate pairing for application within SDMA, and a single user maximum available throughput.

10. A uplink scheduling utility for use at a base station, the uplink scheduling utility comprising:
- an uplink channel estimator that measures an uplink channel transfer function between at least a first single user of a plurality of users and each receive antenna of the base station based on received uplink (UL) signals corresponding to the plurality of users;
- logic that is configured to represent the uplink channel transfer function using eigen-vectors and obtain a normalization of the covariance of channel response corresponding to the plurality of users; and
- a scheduler that determines when a signal is transmitted via UL SDMA, based on one or more SDMA switching conditions, when one or more of the SDMA switching conditions are not satisfied, identifies a signal for single signal assignment to a sub-channel for UL transmission to the base station, and when one or more of the SDMA switching conditions are satisfied, selects at least a pair of users from the plurality of users and allocates multiple signals on same time-frequency resources to the selected pair of users for transmission to the base station using SDMA, wherein the one or more SDMA switching conditions comprise switching to SDMA when an aggregate SDMA throughput of the selected pair of users is greater than or equal to an aggregate throughput of the first single user.

11. The uplink scheduling utility of claim 10, wherein said uplink channel estimator is configured to estimate the uplink channel transfer function with an application of one or more of:
   a received uplink control channel signal to a channel estimation facility at the base-station; and
   a received uplink data channel signal to the channel estimation facility at the base-station.

12. The uplink scheduling utility of claim 11, wherein said uplink channel estimator further comprises functions for:
   obtaining an estimated composite channel response for the set of users;
   obtaining an estimated single channel response vector for an individual signal within the set of users;
   obtaining an estimated composite channel frequency response for the set of users;
   updating a plurality of correlation values from an average of the estimated composite channel frequency response for a particular user within the set of users.

13. The uplink scheduling utility of claim 10, wherein said uplink scheduling utility logic is configured to obtain a normalization of the covariance of channel response by:
   determining a single channel covariance for a plurality of single users, respectively;
   computing a covariance of channel response on sub-carriers for UL SDMA corresponding to a plurality of users; and
   calculating the normalization of the covariance of channel response based on the single channel covariance and the covariance of channel response for UL SDMA; and
   maintaining a matrix of the normalized covariance of channel response between one or more users;
   periodically updating the matrix of the normalized covariance of channel response.

14. The uplink scheduling utility of claim 10, wherein said scheduler is configured to determine when a signal is transmitted via UL SDMA, based on one or more SDMA switching conditions, by:
   estimating the throughput of the first single user being allocated to a sub-channel;
   obtaining an estimated aggregate total of throughput of user signals multiplexed together within a sub-channel;
   wherein calculations of said throughput corresponding to the first single user and said aggregated total throughput corresponding to the multiplexed user signal depend upon the normalized covariance of channel response;
   selecting UL SDMA for second user when the following SDMA switching conditions are satisfied:
      (a) the estimated aggregated total of throughput is greater than or equal to the maximum available throughput of the single signal allocated to the sub-channel;
      (b) the individual signals within the group of multiplexed signals are individually maintained at a minimum preset SINR; and
      (c) the estimated aggregated total of throughput of the first user and the second user is greater than or equal to the estimated aggregated total of throughput of the first user and any other user that satisfies conditions (a) and (b) above;
   wherein the first user is automatically selected when the second user is selected; and
   when the SDMA conditions are not satisfied, assigning the first user to single input multiple output (SIMO) transmission.

15. The uplink scheduling utility of claim 10, wherein said uplink scheduling utility logic is configured to represent the uplink channel transfer function by:
   obtaining a set of eigen-beams comprising eigenvectors and eigenvalues provided by an eigen-decomposition, based on the plurality of correlation values;
   identifying an eigen-vector having the largest eigen-value, for a particular user signal;
   a representation of a single spatial channel response based on the largest eigen-value and the corresponding eigen-vector associated with the single spatial channel;
   and a representation of a composite spatial channel response comprised of representations of the single spatial channel responses.

16. The uplink scheduling utility of claim 10, wherein said scheduler is configured to determine when a signal is transmitted via UL SDMA, based on one or more SDMA switching conditions, by identifying the pair of user signals having the maximum SINR value among a plurality of SINR values defined from: (a) a total SINR summed up over all eigen-beams corresponding to a set of multiplexed user signals; and (b) a plurality of eigen-beams corresponding to associated spatial channels for corresponding user signals.

17. The uplink scheduling utility of claim 10, wherein said scheduler is configured to determine when a signal is transmitted via UL SDMA, based on one or more SDMA switching conditions, by:
   a calculation that identifies the pair of user signals having a higher MIMO capacity value for UL SDMA selection, relative to other unselected user pairs, wherein neither one or more individual signals of an identified user pair nor one or more individual signals of the other unselected user pair is previously identified for UL SDMA selection; and
   one or more calculations which initially identifies a single user signal with high SIMO capacity relative to other user signals and secondly identifies a matching user signal, for the single user signal, in order to obtain a larger MIMO capacity level for UL SDMA selection, relative to other pairings which include the single user signal.

18. The uplink scheduling utility of claim 10, wherein said one or more SDMA switching conditions are based on one or more of the normalized covariance of channel response corresponding to the plurality of users, an aggregate throughput of signals of two or more users of the plurality of users combined as a candidate pairing for application within SDMA, and a single user maximum available throughput.

19. A base station comprising:
   a processor;
   a multiple antenna receiver system;
   a utility which when executed by the processor provides the functions of:
      measuring an uplink channel transfer function between at least a first single user of a plurality of users and each antenna of the multiple antenna receiver system based on received uplink (UL) signals corresponding to the plurality of users;
      representing the uplink channel transfer function using eigen-vectors;
      obtaining a normalization of the covariance of channel response corresponding to the plurality of users;

determining when a signal is transmitted via UL SDMA, based on one or more SDMA switching conditions;

when one or more of the SDMA switching conditions are not satisfied, identifying a signal for single signal assignment to a sub-channel for UL transmission to the base station; and when one or more of the SDMA switching conditions are satisfied, selecting at least a pair of users from the plurality of users and allocating multiple signals on same time-frequency resources to the selected pair of users to the base station using SDMA, wherein the one or more SDMA switching conditions comprise switching to SDMA when an aggregate SDMA throughput of the selected pair of users is greater than or equal to an aggregate throughput of the first single user.

20. The base station of claim 19, further comprising:

a channel response estimator;

a scheduler;

a detection system;

wherein said functions for measuring further comprises functions for estimating the uplink channel transfer function with an application of one or more of (a) a received uplink control channel signal to a channel estimation facility at the base-station; and (b) a received uplink data channel signal to the channel estimation facility at the base-station;

wherein said functions for representing further comprises functions for
- obtaining a set of eigen-beams comprising eigenvectors and eigenvalues provided by an eigen-decomposition, based on the plurality of correlation values;
- identifying an eigen-vector having the largest eigen-value, for a particular user signal;
- a representation of a single spatial channel response based on the largest eigen-value and the corresponding eigen-vector associated with the single spatial channel;
- and a representation of a composite spatial channel response comprised of representations of the single spatial channel responses;

wherein said functions for obtaining further comprises functions for:
- determining a single channel covariance for a plurality of single users, respectively;
- computing a covariance of channel response on sub-carriers for UL SDMA corresponding to a plurality of users;
- calculating the normalization of the covariance of channel response based on the single channel covariance and the covariance of channel response for UL SDMA;
- maintaining a matrix of the normalized covariance of channel response between one or more users;
- periodically updating the matrix of the normalized covariance of channel response.

21. The wireless communication system of claim 20, wherein said functions for estimating further comprises functions for:

obtaining an estimated composite channel response for the set of users;

obtaining an estimated single channel response vector for an individual signal within the set of users;

obtaining an estimated composite channel frequency response for the set of users;

updating a plurality of correlation values from an average of the estimated composite channel frequency response for a particular user within the set of users.

22. The base station of claim 19, wherein said functions for determining further comprises functions for:

estimating the throughput of the first single user being allocated to a sub-channel;

obtaining an estimated aggregate total of throughput of user signals multiplexed together within a sub-channel;

wherein calculations of said throughput corresponding to the first single user and said aggregated total throughput corresponding to the multiplexed user signal depend upon the normalized covariance of channel response;

selecting UL SDMA for a second user when the following SDMA switching conditions are satisfied: (a) the estimated aggregated total of throughput is greater than or equal to the maximum available throughput of the single signal allocated to the sub-channel; (b) the individual signals within the group of multiplexed signals are individually maintained at a minimum preset SINR; and (c) the estimated aggregated total of throughput of the first user and the second user is greater than or equal to the estimated aggregated total of throughput of the first user and any other user that satisfies conditions (a) and (b) above; wherein the first user is automatically selected when the second user is selected; and when the SDMA conditions are not satisfied, assigning the first user to single input multiple output (SIMO) transmission;

wherein said functions for determining further comprises functions for: identifying the pair of user signals having the maximum SINR value among a plurality of SINR values defined from: (a) a total SINR summed up over all eigen-beams corresponding to a set of multiplexed user signals; and (b) a plurality of eigen-beams corresponding to associated spatial channels for corresponding user signals;

a calculation that identifies the pair of user signals having a higher MIMO capacity value for UL SDMA selection, relative to other unselected user pairs, wherein neither one or more individual signals of an identified user pair nor one or more individual signals of the other unselected user pair is previously identified for UL SDMA selection; and one or more calculations which initially identifies a single user signal with high SIMO capacity relative to other user signals and secondly identifies a matching user signal, for the single user signal, in order to obtain a larger MIMO capacity level for UL SDMA selection, relative to other pairings which include the single user signal.

23. The base station of claim 19, wherein said one or more SDMA switching conditions are based on one or more of the normalized covariance of channel response corresponding to the plurality of users, an aggregate throughput of signals of two or more users of the plurality of users combined as a candidate pairing for application within SDMA, and a single user maximum available throughput.

* * * * *